(12) United States Patent
Yu

(10) Patent No.: US 11,584,437 B2
(45) Date of Patent: Feb. 21, 2023

(54) PARKING ASSISTANCE DEVICE AND METHOD

(71) Applicants: Hyundai Motor Company, Seoul (KR); Kia Corporation, Seoul (KR)

(72) Inventor: Hee An Yu, Bucheon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/387,578

(22) Filed: Jul. 28, 2021

(65) Prior Publication Data

US 2022/0161850 A1 May 26, 2022

(30) Foreign Application Priority Data

Nov. 26, 2020 (KR) .................... 10-2020-0161692

(51) Int. Cl.
| | | |
|---|---|---|
| *B62D 15/02* | (2006.01) | |
| *B60K 35/00* | (2006.01) | |
| *B60R 1/00* | (2022.01) | |
| *B60R 11/04* | (2006.01) | |
| *G06K 9/00* | (2022.01) | |

(Continued)

(52) U.S. Cl.
CPC ............ *B62D 15/028* (2013.01); *B60K 35/00* (2013.01); *B60R 1/00* (2013.01); *B60R 11/04* (2013.01); *G06V 20/58* (2022.01); *G06V 20/586* (2022.01); *B60K 2370/119* (2019.05); *B60K 2370/165* (2019.05); *B60K 2370/176* (2019.05); *B60K 2370/179* (2019.05); *B60R 2011/004* (2013.01); *B60R 2300/305* (2013.01); *B60R 2300/806* (2013.01); *B60R 2300/8093* (2013.01)

(58) Field of Classification Search
CPC .... B62D 15/028; G06V 20/58; G06V 20/586; B60K 35/00; B60K 2370/165; B60K 2370/119; B60K 2370/176; B60K 2370/179; B60R 1/00; B60R 11/04; B60R 2011/004; B60R 2300/305; B60R 2300/806; B60R 2300/8093
See application file for complete search history.

(56) References Cited

U.S. PATENT DOCUMENTS

| 8,717,438 | B2 * | 5/2014 | Hosoi ................ B62D 15/0275 348/148 |
|---|---|---|---|
| 2006/0195257 | A1 * | 8/2006 | Nakamura ......... G01C 21/3632 701/437 |

(Continued)

FOREIGN PATENT DOCUMENTS

| EP | 1065642 | A2 * | 1/2001 | ............. B60K 35/00 |
|---|---|---|---|---|
| JP | 2006123605 | A * | 5/2006 | |

(Continued)

*Primary Examiner* — Chico A Foxx
(74) *Attorney, Agent, or Firm* — Slater Matsil, LLP

(57) ABSTRACT

A parking assistance device includes a camera configured to capture a rear-view image of a vehicle, a plurality of sensors configured to sense an obstacle located around the vehicle, a controller configured to generate a parking guide line to guide the vehicle into a target parking space and assist a driver of the vehicle to park based on a separation distance between a predicted entrance trajectory corresponding to a steering angle of the vehicle and the parking guide line, and a display configured to match and display the rear-view image of the vehicle with the parking guide line.

20 Claims, 7 Drawing Sheets

(51) Int. Cl.
*G06V 20/58* (2022.01)
*B60R 11/00* (2006.01)

(56) References Cited

U.S. PATENT DOCUMENTS

| | | | | |
|---|---|---|---|---|
| 2006/0287826 | A1* | 12/2006 | Shimizu | B60Q 9/007 |
| | | | | 701/431 |
| 2010/0070139 | A1* | 3/2010 | Ohshima | B62D 15/028 |
| | | | | 701/42 |
| 2012/0016555 | A1* | 1/2012 | Ghneim | B62D 15/0275 |
| | | | | 701/41 |
| 2013/0187771 | A1* | 7/2013 | Rothschild | G08G 1/096716 |
| | | | | 340/435 |
| 2015/0146270 | A1* | 5/2015 | Huntzicker | G03H 1/26 |
| | | | | 359/13 |
| 2015/0151789 | A1* | 6/2015 | Lee | B62D 5/046 |
| | | | | 701/41 |
| 2017/0253236 | A1* | 9/2017 | Hayakawa | G08G 1/143 |
| 2017/0355307 | A1* | 12/2017 | Ha | G08G 1/143 |
| 2018/0354556 | A1* | 12/2018 | Hirata | G06V 20/588 |
| 2020/0047668 | A1* | 2/2020 | Ueno | G08G 1/166 |

FOREIGN PATENT DOCUMENTS

| | | | | |
|---|---|---|---|---|
| JP | 2006160147 A | * | 6/2006 | |
| WO | WO-2010134240 A1 | * | 11/2010 | B62D 15/028 |

* cited by examiner

PARKING ASSISTANCE DEVICE AND METHOD

CROSS-REFERENCE TO RELATED APPLICATIONS

This application claims the benefit of Korean Patent Application No. 10-2020-0161692, filed in the Korean Intellectual Property Office on Nov. 26, 2020, which application is hereby incorporated herein by reference.

TECHNICAL FIELD

The present disclosure relates to a parking assistance device and method.

BACKGROUND

In general, there is a process using a sensor, a process using a camera, or a process using a sensor and a camera in a complex manner as a process which notifies a driver of a distance between a vehicle and an object located behind the vehicle upon reverse driving or reverse parking of the vehicle.

The process using the sensor may include, for example, a parking distance warning (PDW) system. A plurality of ultrasonic sensors are loaded into a rear bumper of a vehicle. The process using the sensor calculates a distance between the vehicle and an object located behind the vehicle based on a time taken for ultrasonic waves emitted from the ultrasonic sensors to be bumped against the object to return, start to output an alert sound, when the calculated distance is less than a threshold, and output a higher alert sound or an alert sound of a shorter period as the distance is shorter.

The process using the camera may include, for example, a rear view monitor (RVM). A camera which captures a rear-view image of a vehicle is installed in a trunk lid. The process using the camera displays the image captured by the camera on an audio video navigation (AVN) system, such that a driver may safely park while identifying a situation behind the vehicle.

Such a process using the camera displays a parking guide line together with a rear-view image of the vehicle, when the vehicle operates in a reverse parking mode, thus assisting the driver to park while viewing the parking guide line.

However, because the parking guide line is a guide line in a simple form, which interworks with a steering angle of the vehicle, the driver should back up the vehicle while adjusting a steering wheel of the vehicle such that the parking guide line heads for a target parking space.

As a result, because the driver backs up the vehicle while viewing the guide line in the simple form which decreases sentience, while not receiving a path guiding the vehicle to enter the target parking space, he or she has a difficulty to enter the target parking space.

Details described in the background art are written to increase the understanding of the background of the present disclosure, which may include details other than an existing technology well known to those skilled in the art.

SUMMARY

The present disclosure relates to a parking assistance device and method. Particular embodiments relate to technologies of assisting a driver to safely park in a target parking space.

Embodiments of the present disclosure can solve problems occurring in the prior art while advantages achieved by the prior art are maintained intact.

An embodiment of the present disclosure provides a parking assistance device for displaying a parking guide line (a parking guide trajectory) safely guiding the vehicle into a target parking space upon parking, warning a user about incorrect entrance of the vehicle based on a separation distance between a predicted entrance trajectory corresponding to a steering angle of the vehicle and the parking guide line, and displaying a steering direction of the steering wheel allowing the vehicle to follow the parking guide line upon warning to allow the driver to safely park in the target parking space and a method thereof.

The technical problems to be solved by embodiments of the present disclosure are not limited to the aforementioned problems, and any other technical problems not mentioned herein will be clearly understood from the following description by those skilled in the art to which the present disclosure pertains. Furthermore, it may be easily seen that purposes and advantages of embodiments of the present disclosure may be implemented by means indicated in claims and a combination thereof.

According to an embodiment of the present disclosure, a parking assistance device may include a camera that captures a rear-view image of a vehicle, a plurality of sensors that senses an obstacle located around the vehicle, a controller that generates a parking guide line safely guiding the vehicle into a target parking space and assists a driver of the vehicle to park based on a separation distance between a predicted entrance trajectory corresponding to a steering angle of the vehicle and the parking guide line, and a display that matches and displays the rear-view image of the vehicle with the parking guide line.

In an embodiment of the present disclosure, the controller may control the display to display a steering direction of a steering wheel, the steering direction allowing the vehicle to follow the parking guide line, when the separation distance is greater than a reference value.

In an embodiment of the present disclosure, the controller may control the display to display an animation where the steering wheel rotates.

In an embodiment of the present disclosure, the controller may control the display to display a proximity image including the vehicle and the obstacle, when the separation distance is greater than a reference value.

In an embodiment of the present disclosure, the controller may control the display to display a separation distance between the vehicle and the obstacle on the proximity image.

In an embodiment of the present disclosure, the controller may update the separation distance between the vehicle and the obstacle in real time, when the vehicle travels.

In an embodiment of the present disclosure, the controller may control the display to represent the predicted entrance trajectory as a plurality of arrows.

In an embodiment of the present disclosure, the controller may control the display to display the plurality of arrows in green when the predicted entrance trajectory is safe and may display the plurality of arrows in red when the predicted entrance trajectory is dangerous.

In an embodiment of the present disclosure, the controller may control the display to sequentially turn on the plurality of arrows with regard to movement of the vehicle.

According to another embodiment of the present disclosure, a parking assistance method may include capturing, by a camera, a rear-view image of a vehicle, sensing, by a plurality of sensors, an obstacle located around the vehicle, generating, by a controller, a parking guide line safely guiding the vehicle into a target parking space and assisting, by the controller, a driver of the vehicle to park based on a separation distance between a predicted entrance trajectory corresponding to a steering angle of the vehicle and the parking guide line, and matching and displaying, by a display, the rear-view image of the vehicle with the parking guide line.

In an embodiment of the present disclosure, assisting the driver to park may include controlling the display to display a steering direction of a steering wheel, the steering direction allowing the vehicle to follow the parking guide line, when the separation distance is greater than a reference value.

In an embodiment of the present disclosure, assisting the driver to park may further include controlling the display to display an animation where the steering wheel rotates.

In an embodiment of the present disclosure, assisting the driver to park may include controlling the display to display a proximity image including the vehicle and the obstacle, when the separation distance is greater than a reference value.

In an embodiment of the present disclosure, assisting the driver to park may further include controlling the display to display a separation distance between the vehicle and the obstacle on the proximity image.

In an embodiment of the present disclosure, assisting the driver to park may further include updating the separation distance between the vehicle and the obstacle, when the vehicle backs up.

In an embodiment of the present disclosure, assisting the driver to park may include controlling the display to represent the predicted entrance trajectory as a plurality of arrows.

In an embodiment of the present disclosure, assisting the driver to park may further include controlling the display to display the plurality of arrows in green when the predicted entrance trajectory is safe and display the plurality of arrows in red when the predicted entrance trajectory is dangerous.

In an embodiment of the present disclosure, assisting the driver to park may further include controlling the display to sequentially turn on the plurality of arrows with regard to movement of the vehicle.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
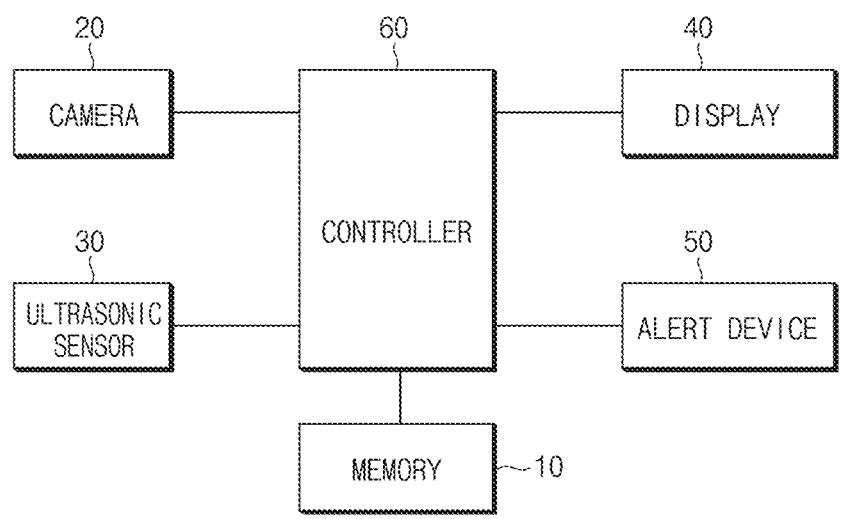
FIG. 1 is a block diagram illustrating a configuration of a parking assistance device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of a parking assistance device according to an embodiment of the present disclosure.

As shown in FIG. 1, the parking assistance device according to an embodiment of the present disclosure may include a memory (i.e., a storage) 10, a camera 20, an ultrasonic sensor 30, a display 40, an alert device 50, and a controller 60. In this case, the respective components may be combined into one component and some components may be omitted, depending on a manner which executes the parking assistance device according to an embodiment of the present disclosure.

Seeing the respective components, first of all, the memory 10 may store various logics, algorithms, and programs required in a process of displaying a parking guide line safely guiding a vehicle into a target parking space upon parking, warning a user about incorrect entrance of the vehicle based on a separation distance between a predicted entrance trajectory corresponding to a steering angle of the vehicle and the parking guide line, and displaying a steering direction of a steering wheel allowing the vehicle to follow the parking guide line upon warning.

The memory 10 may store logic used to calculate a path (trajectory) where the vehicle safely enters the target parking space in a current location of the vehicle, based on an image for the target parking space captured by the camera 20 and information detected by the ultrasonic sensor 30. Such logic may be implemented as one of various manners which are generally widely known.

The memory 10 may store logic used to recognize an object (e.g., a host vehicle, an obstacle, or the like) in the image captured by the camera 20 and calculate a separation distance between the recognized host vehicle and the recognized obstacle. Such logic may be implemented as one of various manners which are generally widely known.

The memory 10 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The camera 20 may be a camera used by a surround view monitor (SVM) provided in the vehicle, which may include, for example, a front view camera located on a radiator grill of the vehicle to capture a forward image of the vehicle, a left view camera located on a lower end of a left side mirror of the vehicle to capture a left image of the vehicle, a right view camera located on a lower end of a right side mirror of the vehicle to capture a right image of the vehicle, and a rear view image located on a trunk lid to capture a backward image of the vehicle.

The ultrasonic sensor 30 may be mounted on a front bumper and a rear bumper of the vehicle to detect an obstacle around the vehicle and measure a distance from the detected obstacle.

The display 40 may be implemented as a cluster or an audio video navigation (AVN) system, which may display a parking guide line safely guiding the vehicle into a target parking space upon parking and may display a steering direction of a steering wheel, which allows the vehicle to follow the parking guide line upon warning. In this case, when displaying the steering direction of the steering wheel, the display 40 may add an animation effect. In other words, the display 40 may display an animation where the steering wheel rotates under control of the controller 60.

The display 40 may display a predicted entrance trajectory corresponding to a steering angle of the vehicle. In this case, the display 40 may represent the predicted entrance trajectory as a plurality of arrows and may sequentially turn on the plurality of arrows with regard to movement of the location of the vehicle under control of the controller 60. Furthermore, the display 40 may represent the plurality of arrows indicating the predicted entrance trajectory of the vehicle in red (as collision warning) or in green (as normal entrance).

The alert device 50 may have a microphone. When there is a probability that the predicted entrance trajectory of the vehicle will collide with an obstacle (e.g., when the predicted entrance trajectory of the vehicle is represented in red), the alert device 50 may output an alert sound under control of the controller 60.

The controller 60 may perform the overall control such that respective components may normally perform their own functions. Such a controller 60 may be implemented in the form of hardware, may be implemented in the form of software, or may be implemented in the form of a combination thereof. Preferably, the controller 60 may be implemented as, but not limited to, a microprocessor.

Particularly, the controller 60 may perform a variety of control in a process of displaying a parking guide line safely guiding a vehicle into a target parking space upon parking, warning a user about incorrect entrance of the vehicle based on a separation distance between a predicted entrance trajectory corresponding to a steering angle of the vehicle and the parking guide line, and displaying a steering direction of a steering wheel allowing the vehicle to follow the parking guide line upon warning. In this case, when the separation distance is greater than a reference value, the controller 60 may warn the driver about incorrect entrance of the driver.

Hereinafter, the operation of the controller 60 will be described in detail with reference to FIGS. 2A to 2D.

Figure 2A:
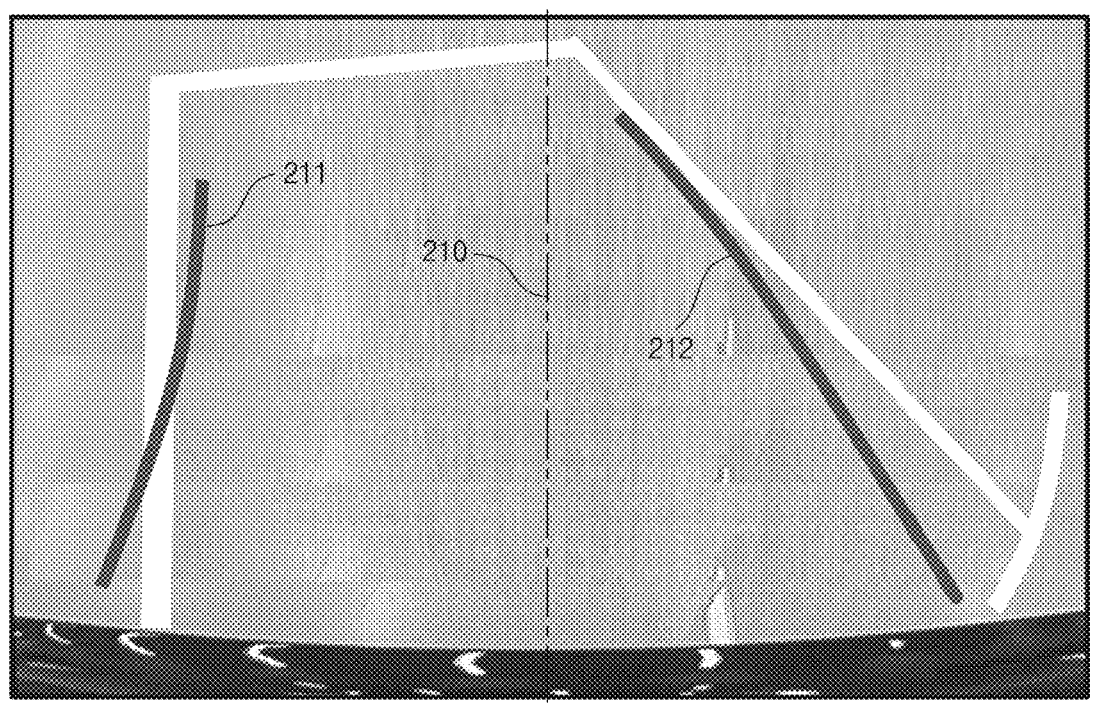
FIG. 2A is a drawing illustrating an example of a process of assisting in parking in a controller provided in a parking assistance device according to an embodiment of the present disclosure.

FIG. 2A is a drawing illustrating an example of a process of assisting in parking in a controller provided in a parking assistance device according to an embodiment of the present disclosure, which illustrates that an obstacle is not located in a target parking space.

In FIG. 2A, reference numeral '210' indicates the central line of the vehicle, reference numeral '211' indicates the parking guide line (the parking guide trajectory) of the right wheel of the vehicle, and reference numeral '212' indicates the parking guide line (the parking guide trajectory) of the left wheel of the vehicle. When a reverse parking mode is set by a driver, a controller 60 of FIG. 1 may detect a line of a target parking space from an image obtained by a camera 20 of FIG. 1 and may generate the parking guide lines 211 and 212 safely guiding a vehicle into the target parking space based on the detected line of the target parking space. Herein, the reverse parking mode may simply refer to a state where the driver shifts into the reverse gear. In this case, the controller 60 may determine whether to generate a parking guide line depending on whether the parking space line is detected.

As shown in FIG. 2A, the controller 60 may control a display 40 of FIG. 1 to match and display the generated parking guide lines 211 and 212 with a rear-view image of the vehicle. In other words, the controller 60 may control the display 40 to display the generated parking guide lines 211 and 212 together in interconnection with the rear-view image of the vehicle.

Figure 2B:
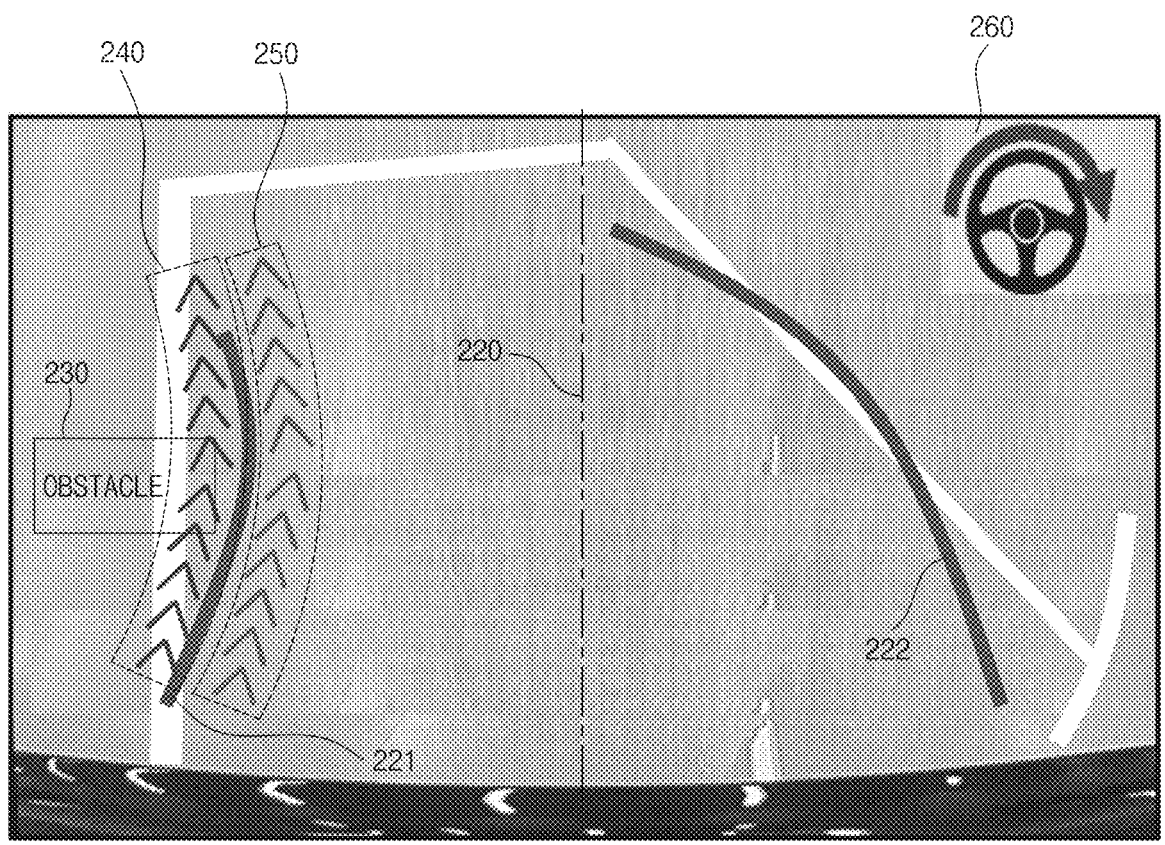
FIG. 2B is a drawing illustrating another example of a process of assisting in parking in a controller provided in a parking assistance device according to an embodiment of the present disclosure.

FIG. 2B is a drawing illustrating another example of a process of assisting in parking in a controller provided in a parking assistance device according to an embodiment of the present disclosure, which illustrates that an obstacle 230 is located in a target parking space.

In FIG. 2B, reference numeral '220' indicates the central line of the vehicle, reference numeral '221' indicates the parking guide line of the right wheel of the vehicle, reference numeral '222' indicates the parking guide line of the left wheel of the vehicle, reference numeral '230' indicates the obstacle, reference numeral '240' indicates the first predicted entrance trajectory corresponding to the steering angle of the vehicle, reference numeral '250' indicates the second predicted entrance trajectory corresponding to the steering wheel of the vehicle, and reference numeral '260' indicates the steering direction of the steering wheel allowing the vehicle to follow the parking guide line.

When a reverse parking mode is set by a driver, a controller 60 of FIG. 1 may detect a line of a target parking space from an image obtained by a camera 20 of FIG. 1 and may generate the parking guide lines 221 and 222 safely guiding a vehicle into the target parking space based on the detected line of the target parking space and information (e.g., a location, a distance, or the like) about an obstacle, which is obtained by an ultrasonic sensor 30 of FIG. 1. Herein, the reverse parking mode may simply refer to a state where the driver shifts into the reverse gear. In this case, the controller 60 may determine whether to generate a parking guide line depending on whether the parking space line is detected.

As shown in FIG. 2B, the controller 60 may control a display 40 of FIG. 1 to match and display the generated parking guide lines 221 and 222 with a rear-view image of the vehicle.

When a predicted entrance trajectory in the target parking space of the vehicle is a trajectory which is predicted to collide with the obstacle 230 like the first predicted entrance trajectory 240, the controller 60 may control the display 40 to display the predicted entrance trajectory in red. When the predicted entrance trajectory in the target parking space of the vehicle is a trajectory which is not predicted to collide with the obstacle 230 like the second predicted entrance trajectory 250, the controller 60 may control the display 40 to display the predicted entrance trajectory in green.

As shown in FIG. 2B, the controller 60 may represent the first predicted entrance trajectory 240 and the second predicted entrance trajectory 250 as a plurality of arrows (icons), respectively, and may control the display 40 to sequentially turn on the plurality of arrows with regard to movement of the location of the vehicle. For example, the controller 60 may control the display 40 to sequentially turn on the plurality of arrows indicating the second predicted entrance trajectory 250 depending on a location where the vehicle enters the target parking space. In this case, when the entrance of the vehicle is completed, the last arrow may be turned on.

It is shown that it is predicted to collide with the obstacle (that the predicted entrance trajectory is the first predicted entrance trajectory 240) as a warning condition upon parking in FIG. 2B. However, an embodiment of the present disclosure has a purpose in allowing the driver to allow the vehicle to enter along the parking guide lines 221 and 222 and assisting the driver to park. It is preferable to set when a separation distance between the predicted entrance trajectory of the vehicle and the parking guide line is greater than a reference value as a warning condition. This is because the controller 60 generates the parking guide line with regard to whether there is a collision with an obstacle (e.g., obstacle information sensed by the ultrasonic sensor 30).

Figure 2C:
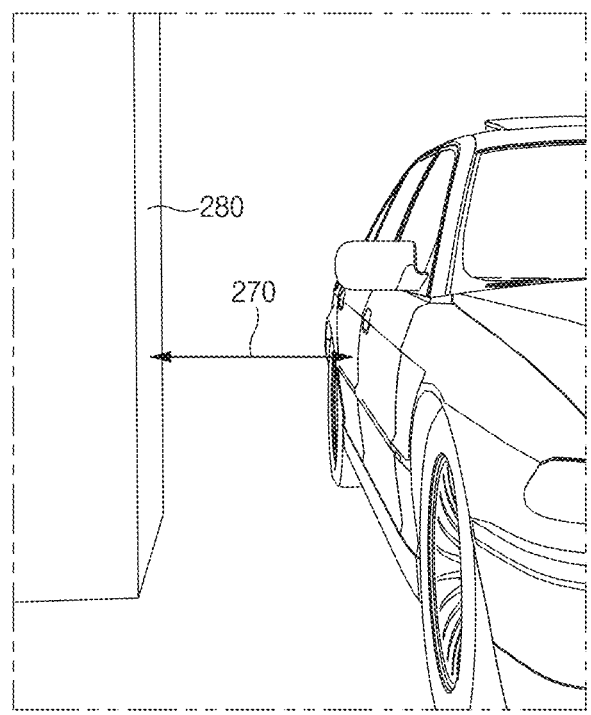
FIG. 2C is a drawing illustrating an example of a side-view image provided upon warning by a controller provided in a parking assistance device according to an embodiment of the present disclosure.

FIG. 2C is a drawing illustrating an example of a side-view image provided upon warning by a controller provided in a parking assistance device according to an embodiment of the present disclosure.

When a predicted entrance trajectory in a target parking space of a vehicle is a first predicted entrance trajectory 240 of FIG. 2B, as shown in FIG. 2C, a controller 60 provided in the parking assistance device according to an embodiment of the present disclosure may control a display 40 of FIG. 1 to display a separation distance 270 between the vehicle and an obstacle 280 together with a side-view image of the vehicle (e.g., a proximity image in the indirection of an obstacle 280). In this case, the controller 60 may detect the separation distance 270 between the vehicle and the obstacle 280 based on the side-view image. Particularly, when the vehicle backs up, the controller 60 may update the separation distance 270 in real time. Of course, the controller 60 may detect a separation distance by means of an ultrasonic sensor located on a side of the vehicle. Furthermore, the controller 60 may display a proximity image in the form of a pop-up.

Figure 2D:
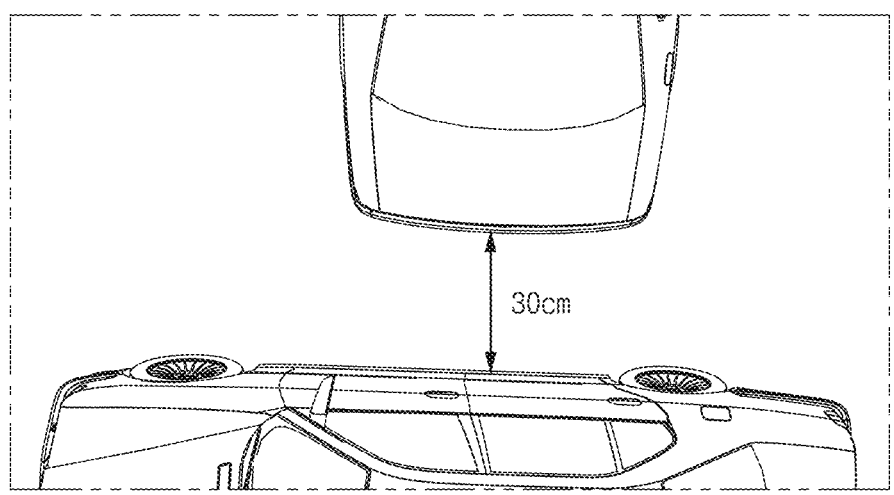
FIG. 2D is a drawing illustrating an example of a rear-view image provided by a controller provided in a parking assistance device according to an embodiment of the present disclosure.

FIG. 2D is a drawing illustrating an example of a rear-view image provided by a controller provided in a parking assistance device according to an embodiment of the present disclosure.

When an obstacle is located behind in a process where a vehicle enters a target parking space, as shown in FIG. 2D, a controller 60 provided in the parking assistance device according to an embodiment of the present disclosure may control a display 40 of FIG. 1 to display a separation distance between the vehicle and the obstacle together with a rear-view image (e.g., a top-view image) of the vehicle. In this case, the controller 60 may detect the separation distance between the vehicle and the obstacle based on the rear-view image. Particularly, when the vehicle backs up, the controller 60 may update the separation distance in real time.

Figure 3:
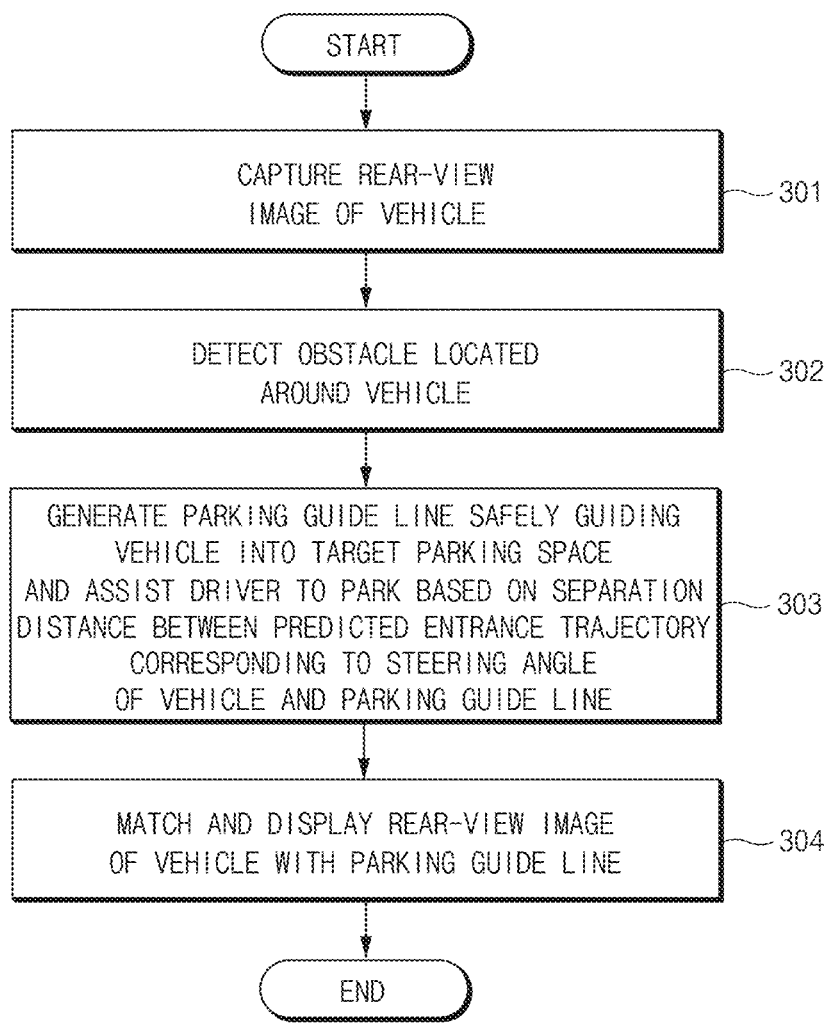
FIG. 3 is a flowchart illustrating a parking assistance method according to an embodiment of the present disclosure.

FIG. 3 is a flowchart illustrating a parking assistance method according to an embodiment of the present disclosure.

First of all, in operation 301, a camera 20 of FIG. 1 may capture a rear-view image of a vehicle.

In operation 302, a plurality of ultrasonic sensors 30 of FIG. 1 may sense an obstacle located around the vehicle.

In operation 303, a controller 60 of FIG. 1 may generate a parking guide line safely guiding the vehicle into a target parking space and may assist a driver to park based on a separation distance between a predicted entrance trajectory corresponding to a steering angle of the vehicle and the parking guide line.

In operation 304, a display 40 of FIG. 1 may match and display a rear-view image of the vehicle with the parking guide line under control of the controller 60.

Figure 4:
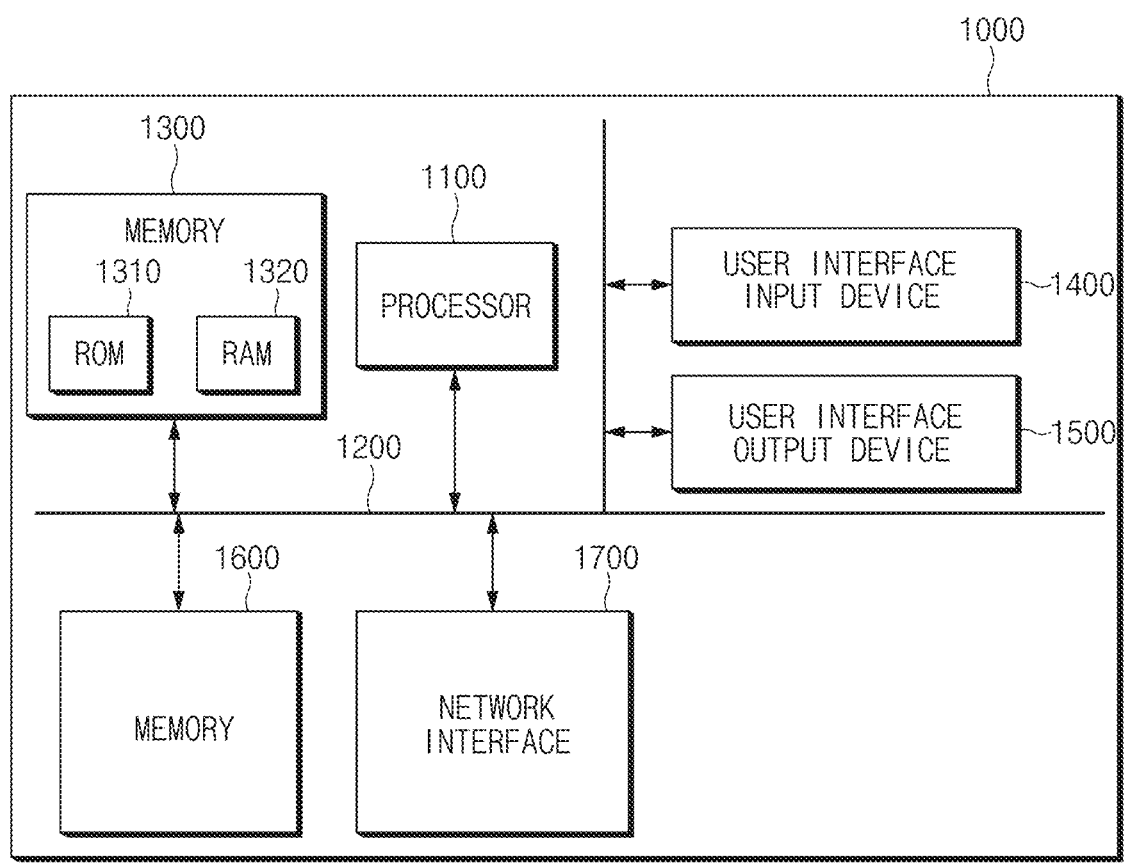
FIG. 4 is a block diagram illustrating a computing system for executing a parking assistance method according to an embodiment of the present disclosure.

FIG. 4 is a block diagram illustrating a computing system for executing a parking assistance method according to an embodiment of the present disclosure.

Referring to FIG. 4, the above-mentioned parking assistance method according to an embodiment of the present disclosure may be implemented by means of the computing system. A computing system moo may include at least one processor 1100, a memory 1300, a user interface input device 1400, a user interface output device 1500, a memory (i.e., a storage) 1600, and a network interface 1700, which are connected with each other via a bus 1200.

The processor 1100 may be a central processing unit (CPU) or a semiconductor device that processes instructions stored in the memory 1300 and/or the memory 1600. The memory 1300 and the memory 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the memory 1600) such as a RAM, a flash memory, a ROM, an EPROM, an EEPROM, a register, a hard disk, a SSD (Solid State Drive), a removable disk, and a CD-ROM. The exemplary storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The parking assistance device and the method thereof according to an embodiment of the present disclosure may be provided to display a parking guide line safely guiding the vehicle into a target parking space upon parking, warn a user about incorrect entrance of the vehicle based on a separation distance between a predicted entrance trajectory corresponding to a steering angle of the vehicle and the parking guide line, and display a steering direction of the steering wheel allowing the vehicle to follow the parking guide line upon warning, thus allowing the driver to safely park in the target parking space.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A parking assistance device comprising:
a camera configured to capture a rear-view image from a vehicle;
a plurality of sensors configured to sense an obstacle located around the vehicle;
a controller configured to generate a parking guide line to guide the vehicle into a target parking space to assist a driver of the vehicle to park based on a separation distance between a predicted entrance trajectory corresponding to a steering angle of the vehicle and the parking guide line and to determine that the separation distance is greater than a reference value; and
a display configured to match and display the rear-view image of the vehicle with the parking guide line and, when the separation distance is greater than the reference value, a steering direction of a steering wheel, the steering direction allowing the vehicle to follow the parking guide line to assist in avoiding collision with the obstacle.

2. The parking assistance device of claim 1, wherein the controller is configured to control the display to display an animation where the steering wheel rotates.

3. The parking assistance device of claim 1, wherein the controller is configured to control the display to display a proximity image including the vehicle and the obstacle when the separation distance is greater than the reference value.

4. The parking assistance device 3, wherein the controller is configured to control the display to display the separation distance between the vehicle and the obstacle on the proximity image.

5. The parking assistance device of claim 4, wherein the controller is configured to update the separation distance between the vehicle and the obstacle in real time while the vehicle travels.

6. The parking assistance device of claim 1, wherein the controller is configured to control the display to represent the predicted entrance trajectory as a plurality of arrows.

7. The parking assistance device of claim 6, wherein the controller is configured to control the display to display the plurality of arrows in green when the predicted entrance trajectory is safe and display the plurality of arrows in red when the predicted entrance trajectory is not safe.

8. The parking assistance device of claim 6, wherein the controller is configured to control the display to sequentially turn on the plurality of arrows with regard to movement of the vehicle.

9. A parking assistance method comprising:
capturing, by a camera, a rear-view image from a vehicle;
sensing, by a plurality of sensors, an obstacle located around the vehicle;
generating a parking guide line to guide the vehicle into a target parking space to assist a driver of the vehicle to park based on a separation distance between a predicted entrance trajectory corresponding to a steering angle of the vehicle and the parking guide line;
determining that the separation distance is greater than a reference value; and
matching and displaying the rear-view image of the vehicle with the parking guide line, wherein the driver is assisted to park by displaying a steering direction of a steering wheel, the steering direction allowing the vehicle to follow the parking guide line to assist in avoiding collision with the obstacle.

10. The parking assistance method of claim 9, wherein the driver is assisted to park by displaying an animation where the steering wheel rotates.

11. The parking assistance method of claim 9, wherein the driver is assisted to park by displaying a proximity image including the vehicle and the obstacle.

12. The parking assistance method of claim 11, wherein the driver is assisted to park by displaying the separation distance between the vehicle and the obstacle on the proximity image.

13. The parking assistance method of claim 12, wherein the driver is assisted to park further by updating the separation distance between the vehicle and the obstacle as the vehicle backs up.

14. The parking assistance method of claim 9, wherein the driver is assisted to park by displaying the predicted entrance trajectory as a plurality of arrows.

15. The parking assistance method of claim 14, wherein the driver is assisted to park by displaying the plurality of arrows in green when the predicted entrance trajectory is safe and displaying the plurality of arrows in red when the predicted entrance trajectory is not safe.

16. The parking assistance method of claim 14, wherein the driver is assisted to park by sequentially turning on the plurality of arrows with regard to movement of the vehicle.

17. A vehicle comprising:
a vehicle body;
a rear bumper attached to a rear of the vehicle body;
a camera disposed on the rear bumper of the vehicle and configured to capture a rear-view image from the vehicle;
a plurality of sensors disposed on the vehicle body and configured to sense an obstacle located around the vehicle;
a controller configured to generate a parking guide line to safely guide the vehicle into a target parking space and assist a driver of the vehicle to park based on a separation distance between a predicted entrance trajectory corresponding to a steering angle of the vehicle and the parking guide line and to determine that the separation distance is greater than a reference value; and
a display disposed in the vehicle and configured to match and display the rear-view image of the vehicle with the parking guide line and, when the separation distance is greater than the reference value, a steering direction of a steering wheel, the steering direction allowing the vehicle to follow the parking guide line to assist in avoiding collision with the obstacle.

18. The vehicle of claim 17, wherein the controller is configured to control the display to display an animation where the steering wheel rotates.

19. The vehicle of claim 17, wherein the controller is configured to control the display to display a proximity image including the vehicle and the obstacle when the separation distance is greater than the reference value.

20. The vehicle of claim 17, wherein the controller is configured to control the display to represent the predicted entrance trajectory as a plurality of arrows.

* * * * *

UNITED STATES PATENT AND TRADEMARK OFFICE
CERTIFICATE OF CORRECTION

PATENT NO. : 11,584,437 B2
APPLICATION NO. : 17/387578
DATED : February 21, 2023
INVENTOR(S) : Hee An Yu It is certified that error appears in the above-identified patent and that said Letters Patent is hereby corrected as shown below:

In the Claims

Claim 4, Column 9, Line 52; insert --of claim-- after "device".

Signed and Sealed this
Fourth Day of April, 2023

Katherine Kelly Vidal
Director of the United States Patent and Trademark Office